(12) United States Patent
Zientek et al.

(10) Patent No.: US 10,836,422 B2
(45) Date of Patent: Nov. 17, 2020

(54) METHOD FOR OPERATING AN ELECTRICAL POWER STEERING SYSTEM OF A MOTOR VEHICLE AND AN ELECTRIC POWER STEERING SYSTEM FOR A MOTOR VEHICLE

(71) Applicant: VOLKSWAGEN AG, Wolfsburg (DE)

(72) Inventors: Jens Zientek, Sommersdorf (DE); Johannes Maria Schäfer, Werben OT Berge (DE)

(73) Assignee: Volkswagen AG, Wolfsburg (DE)

( * ) Notice: Subject to any disclaimer, the term of this patent is extended or adjusted under 35 U.S.C. 154(b) by 377 days.

(21) Appl. No.: 15/689,359

(22) Filed: Aug. 29, 2017

(65) Prior Publication Data
US 2018/0057042 A1 Mar. 1, 2018

(30) Foreign Application Priority Data

Aug. 29, 2016 (DE) .................. 10 2016 216 145

(51) Int. Cl.
*B62D 5/04* (2006.01)
*B62D 6/00* (2006.01)

(52) U.S. Cl.
CPC ......... *B62D 5/0466* (2013.01); *B62D 5/0463* (2013.01); *B62D 5/0496* (2013.01); *B62D 6/008* (2013.01)

(58) Field of Classification Search
CPC .. B62D 5/0466; B62D 5/0463; B62D 5/0496; B62D 6/008
See application file for complete search history.

(56) References Cited

U.S. PATENT DOCUMENTS

| | | | | |
|---|---|---|---|---|
| 4,753,308 A * | 6/1988 | Noto | .................... | B62D 5/0463 180/446 |
| 5,473,231 A * | 12/1995 | McLaughlin | ........ | B62D 5/0463 180/446 |
| 5,740,040 A * | 4/1998 | Kifuku | ................. | B62D 5/0463 701/41 |
| 6,575,263 B2 * | 6/2003 | Hjelsand | ................ | B62D 5/003 180/402 |

(Continued)

FOREIGN PATENT DOCUMENTS

DE 10392688 B4 4/2010
DE 102014211815 A1 12/2015

(Continued)

*Primary Examiner* — Jacob D Knutson
*Assistant Examiner* — Michael R Stabley
(74) *Attorney, Agent, or Firm* — Barnes & Thornburg LLP

(57) ABSTRACT

A method for operating an electric power steering system of a motor vehicle, wherein a steering wheel angle is specified by a steering handle as a measurement for a desired wheel steering angle for at least one steerable wheel of the motor vehicle, wherein an electric servo drive having an electric motor provides steering assistance, and wherein an additional restoring force is provided to compensate for increased internal friction in the power steering system based upon temperature, wherein the additional restoring force is reduced based upon a desired steering direction that is detected at the steering handle. Also disclosed is an associated electric power steering system, an associated computer program, and an associated control unit.

17 Claims, 4 Drawing Sheets

(56) References Cited

U.S. PATENT DOCUMENTS

| | | | | |
|---|---|---|---|---|
| 6,918,460 | B2* | 7/2005 | Tajima | B62D 6/002 |
| | | | | 180/402 |
| 8,229,629 | B2* | 7/2012 | Limpibunterng | B62D 5/0463 |
| | | | | 477/76 |
| 8,977,436 | B2* | 3/2015 | Endo | B62D 5/0463 |
| | | | | 701/42 |
| 9,592,848 | B1* | 3/2017 | Hirate | B62D 5/0463 |
| | | | | 180/446 |
| 2004/0206570 | A1* | 10/2004 | Tajima | B62D 6/002 |
| | | | | 180/402 |
| 2012/0111658 | A1* | 5/2012 | Hori | B62D 5/008 |
| | | | | 180/446 |
| 2015/0203147 | A1* | 7/2015 | Kuramochi | B62D 5/001 |
| | | | | 701/41 |

FOREIGN PATENT DOCUMENTS

| | | |
|---|---|---|
| EP | 2061691 A1 | 5/2009 |
| JP | H05229445 A | 9/1993 |

* cited by examiner

METHOD FOR OPERATING AN ELECTRICAL POWER STEERING SYSTEM OF A MOTOR VEHICLE AND AN ELECTRIC POWER STEERING SYSTEM FOR A MOTOR VEHICLE

PRIORITY CLAIM

This patent application claims priority to German Patent Application No. 10 2016 216 145.8, filed 29 Aug. 2016, the disclosure of which is incorporated herein by reference in its entirety.

SUMMARY

Illustrative embodiments relate to a method for operating an electric power steering system of a motor vehicle, an electric power steering system for a motor vehicle, a computer program, and a control unit of a power steering system.

BRIEF DESCRIPTION OF THE DRAWINGS

The disclosed embodiments are further explained with reference to the figures. In the drawings.

DETAILED DESCRIPTION

Figure 1:
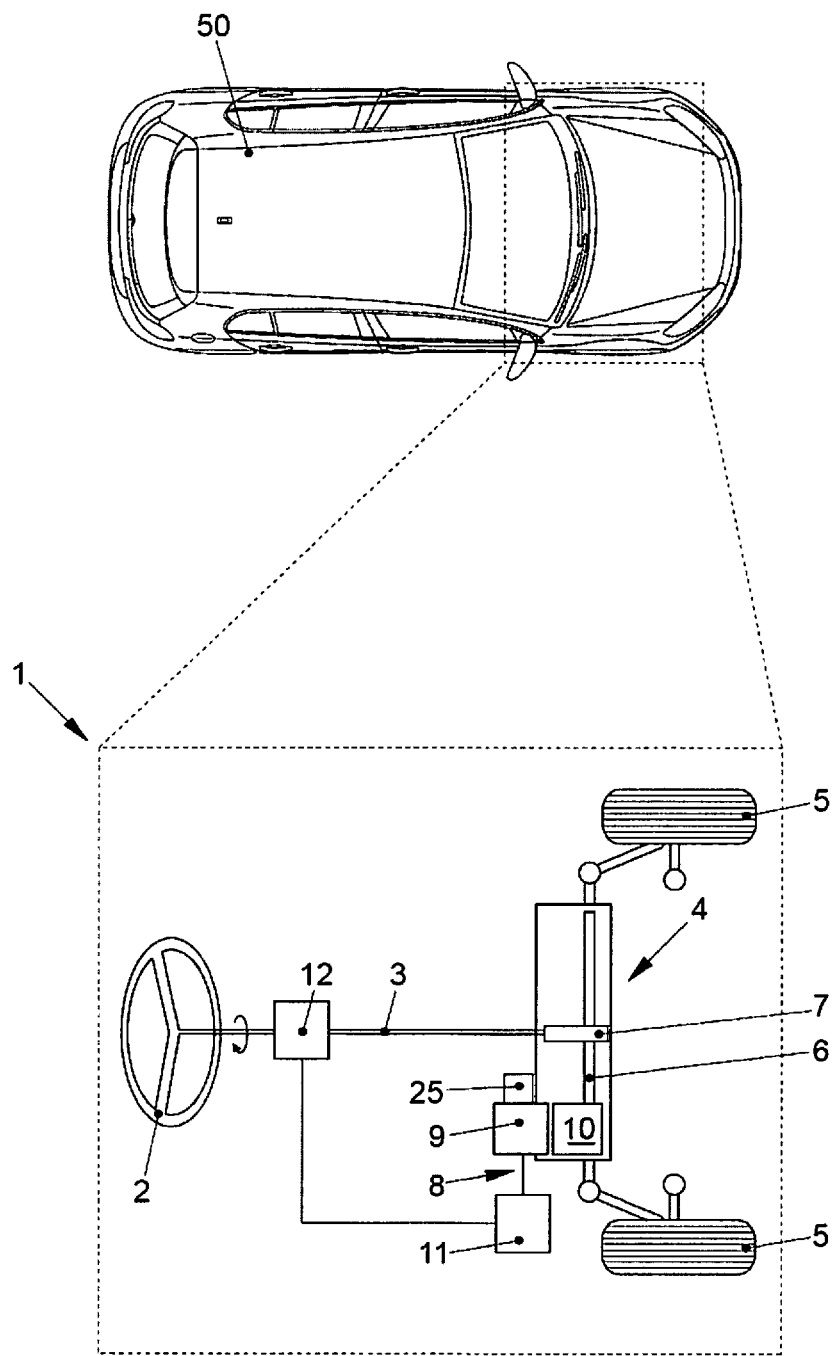
FIG. 1 illustrates a schematic view of a disclosed embodiment of an electric power steering system for a motor vehicle.

Almost all modern motor vehicles are equipped with an electric power steering system wherein a steering assistance system assists the driver of the vehicle to steer. In the case of these electro-mechanical steering systems, the grease that is used is sluggish at low temperatures, in other words its viscosity increases. As a consequence, the entire steering system is subjected to a greater magnitude of internal friction. Methods are known from the prior art that, by use of an additional restoring force, compensate for an increase in the internal friction.

DE 103 92 688 B4 discloses a control method for an electric power steering system, wherein at least one parameter is input into an electronic control unit of the electric power steering system and evaluated, the parameter being representative for a value of the temperature that is prevailing in the vehicle, to ensure based upon the operating temperature an automatic compensation for the changes in the mechanical characteristics of the power steering system, including the fluctuation of the coefficient of friction of moving parts, wherein the parameter is formed from a temperature signal that is provided by a temperature sensor that is located outside the power steering system in one part of the relevant vehicle, or the parameter is formed from a temperature signal that is provided by a temperature sensor that is located in one part of the steering system of the relevant vehicle, or the parameter is a signal that originates from a model calculation of the temperature of the mechanical part of the electric power steering system, wherein this signal is calculated by an electronic control unit of the electric power steering system, wherein the control unit processes or evaluates the parameter to compensate for the effects of temperature fluctuations on the power steering system.

A similar device is disclosed in JP-H-05229445.

Conventionally, it is intended that the additional restoring force ensures that after a steering maneuver the steering system can automatically rotate back into a middle position or straight-on position or a 0-position or is returned to the position even in the case of increased internal friction. The additional restoring force is provided for this purpose by way of example by a servo drive.

However, in the case of the known method, in addition to compensating for the increased internal friction of the steering system the additional restoring force also influences the steering behavior so that as a consequence the driver is given a false steering sensation.

The disclosed embodiments provide a method for operating an electric power steering system of a motor vehicle, an electric power steering system for a motor vehicle, a computer program and a control unit of a power steering system in which the steering sensation is improved.

A method for operating an electric power steering system of a motor vehicle is provided, wherein, by use of a steering handle, a steering wheel angle is specified as a measurement for a desired wheel steering angle for at least one steerable wheel of the motor vehicle, wherein an electric servo drive having an electric motor provides steering assistance, and wherein so as to compensate for increased internal friction in the power steering system an additional restoring force is provided based upon temperature, wherein the additional restoring force is reduced based upon a desired steering direction that is detected at the steering handle.

Moreover, an electric power steering system for a motor vehicle is provided, the steering system comprising a steering handle for specifying a steering wheel angle as a measurement for a desired wheel steering angle for at least one steerable wheel of the motor vehicle, an electric servo drive having an electric motor for providing steering assistance, and an electronic control unit for the electric servo drive, wherein the electronic control unit is configured in such a manner, so as to compensate for an increased internal friction of the power steering system, as to cause the electrical servo drive to provide an additional restoring force based upon the temperature, wherein the electronic control unit is moreover configured in such a manner as to reduce the additional restoring force based upon a desired steering direction that is detected at the steering handle.

Moreover, a computer program having a program code is provided so as to perform the described method if the program is executed on a microprocessor of a computer, for instance. on a control unit of a power steering system.

Simultaneously, a control unit of a power steering system is provided and configured so as to perform the described method or to execute a computer program of the above-mentioned type.

In accordance with the disclosure, upon detecting a desired steering direction, the magnitude of additional restoring force provided is reduced so as to compensate for the increased internal friction in the steering system. The desired steering direction can be detected by way of example by way of a corresponding sensor system on the steering system, by way of example by way of a torsion bar and the measurement signals that are generated can be evaluated and detected by the control unit. The control unit subsequently reduces the additional restoring force by controlling the servo drive in the appropriate manner.

Utility of the disclosure resides in the fact that it is possible to produce a haptic feedback at the steering handle, by way of example at a steering wheel, the haptic feedback corresponding to the feedback when steering in the case of a normal operation (normal temperatures), wherein it is still ensured that the internal friction is completely compensated for.

It is possible to provide that the described method is only performed if an additional restoring force is provided or activated. If by way of example the temperatures are normal, in other words temperatures at which the viscosity of the lubricant or grease being used does not come into consideration, then the method is not performed.

It is provided in at least one disclosed embodiment that the additional restoring force is reduced based upon a manual torque-dependent characteristic curve. This renders it possible to reduce in a purposeful manner the additional restoring force on the basis of a manual torque that is detected at the steering handle. It is thus possible to provide by way of example that the additional restoring force that is provided so as to compensate for the internal friction is greatly reduced or even completely reduced if the driver applies higher manual torques, the additional restoring force is however only slightly reduced in the case of lower manual torques.

It is provided in a further disclosed embodiment that the additional restoring force is reduced based upon a steering direction. The steering direction is to denote in this case whether the steering is away from a 0-position or towards a 0-position. This is beneficial if the additional restoring force is to be reduced at different rates for different steering directions.

It is provided in at least one disclosed embodiment that the additional restoring force is reduced more sharply when steering away from the 0-position than when steering towards the 0-position. It is possible to achieve in this manner that a driver who is steering in the opposite direction to the direction of the restoring force of the steering system does not yet have to steer against the additional restoring force. If, on the other hand, the driver is steering in the direction of the restoring force, in other words towards the 0-position, then the additional restoring force can be reduced less sharply.

FIG. 1 illustrates a schematic view of a disclosed embodiment of an electric power steering system 1 for a motor vehicle 50. The electric power steering system 1 comprises a steering handle 2 that is configured as a steering wheel. The steering handle 2 is connected to a steering mechanism 4 by way of a steering column 3. The steering mechanism 4 is used so as to convert an angle of rotation of the steering column 3 into a steering angle of the steerable wheels 5 of the motor vehicle 50. The steering mechanism 4 comprises for this purpose a toothed rack 6 and a pinion 7 and the steering column 3 engages with the steering mechanism. Moreover, the electric power steering system 1 comprises an electric servo drive 8 having an electric motor 9 that is used to apply an assistance torque by way of a belt drive 10. The belt drive 10 comprises a drive pinion and a belt disk for transmitting the assistance torque by way of a ball-type planetary gear (not illustrated in FIG. 1) to the toothed rack 6 of the electric power steering system 1. Furthermore, an electronic control device 11 is provided for controlling and regulating the electric motor 9.

The construction of the electric power steering system 1 illustrated in the figure is merely exemplary. The electric power steering system 1 can in principle also be constructed differently, by way of example as a double pinion steering system.

The electric power steering system 1 is embodied in such a manner, so as to compensate for an increased internal friction of the power steering system 1, as to provide an additional restoring force based upon the temperature. The additional restoring force is intended to ensure that after a steering maneuver the electric power steering system 1 can automatically rotate back into a 0-position (middle position) or is returned to the position even in the case of increased internal friction. For this purpose, by way of example a temperature is detected at or in the vicinity of the power steering system 1 by a temperature sensor 25, evaluated and transmitted as an input variable to the control unit 11. If by way of example the prevailing temperatures are below a specified limit value, then the additional restoring force can be activated by the control unit 11. The servo drive 8 subsequently provides the additional restoring force as an additional torque. If a driver's desired steering direction is detected at the steering handle 2, then the additional restoring force is reduced based upon a steering direction. To detect the desired steering direction, data from a sensor system 12 is transmitted to the control unit 11 and the data is evaluated in the control unit 11. The sensor system 12, by way of example a torsion rod, detects for this purpose by way of example a manual torque at the steering handle 2 and converts the value of the manual torque into corresponding sensor data. If the detected manual torque value exceeds a specific value, then the control unit 11 accepts this as being a driver's desired steering direction.

It is possible to provide that the additional restoring force is reduced based upon the manual torque-dependent characteristic curve.

Figure 2:
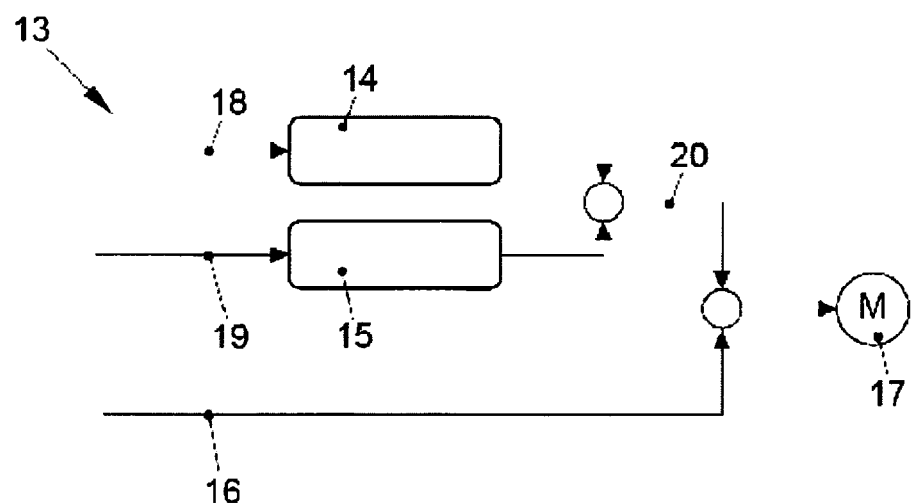
FIG. 2 illustrates a schematic view of a signal flow diagram for explaining the disclosed embodiment.

FIG. 2 illustrates a schematic view of a signal flow diagram 13 for explaining the disclosure. A circuit based on this signal flow diagram 13 is implemented by way of example in the control unit 11 (FIG. 1). The value for the entire assistance torque 17 is derived in part from the normal assistance torque 16 and in part from the additional restoring force 20. The additional restoring force 20 is derived from a temperature compensating torque 14 which is reduced by way of a manual torque-dependent characteristic curve 15 in accordance with the described method based upon a desired steering direction that is detected at the steering handle.

Figure 3:
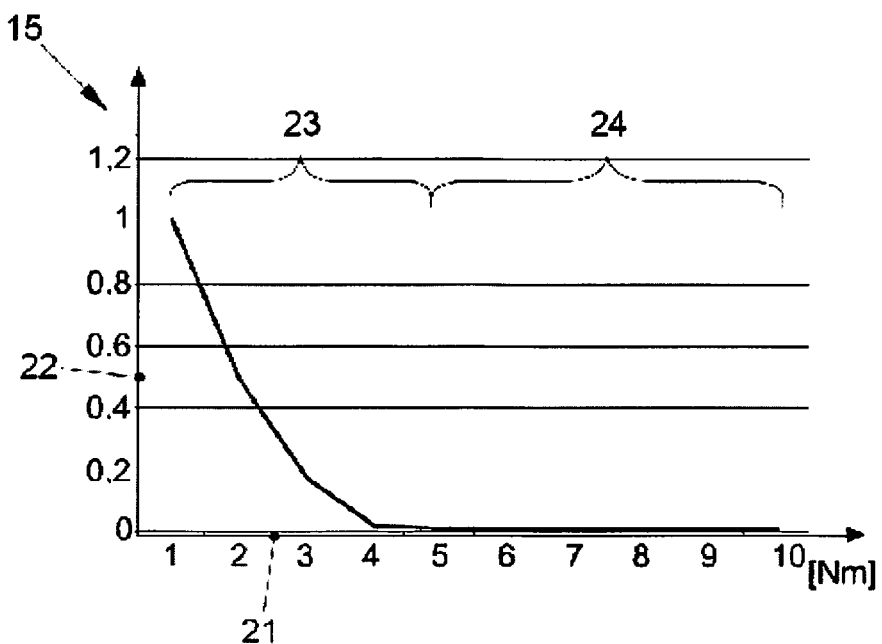
FIG. 3 illustrates a schematic view of a manual torque-dependent characteristic curve of the additional restoring force.

FIG. 3 illustrates a schematic illustration of such a manual torque-dependent characteristic curve 15 of the additional restoring force. The manual torque 21 is plotted in Nm on the x-axis. This manual torque 21 is by way of example detected by a corresponding sensor system at the steering handle or the steering column. A factor 22 is illustrated on the y-axis and a maximum value for the additional restoring force is multiplied by the factor. The progression of the manual torque-dependent characteristic curve 15 is descending, in other words as the manual torque 21 increases, the factor 22 reduces and thus also the magnitude of provided additional restoring force reduces.

The manual torque-dependent characteristic curve 15 comprises by way of example two sections 23, 24. The factor 22 descends in the first section 23 from 1, in other words the magnitude of the entire additional restoring force reduces to 0 in the second section 24. Consequently, additional restoring force is not provided in the second section 24. This manual torque-dependent characteristic curve 15 in this figure illustrates that the greater the manual torque 21 that is applied by the driver, the more sharply the additional restoring force is reduced.

Figure 4:
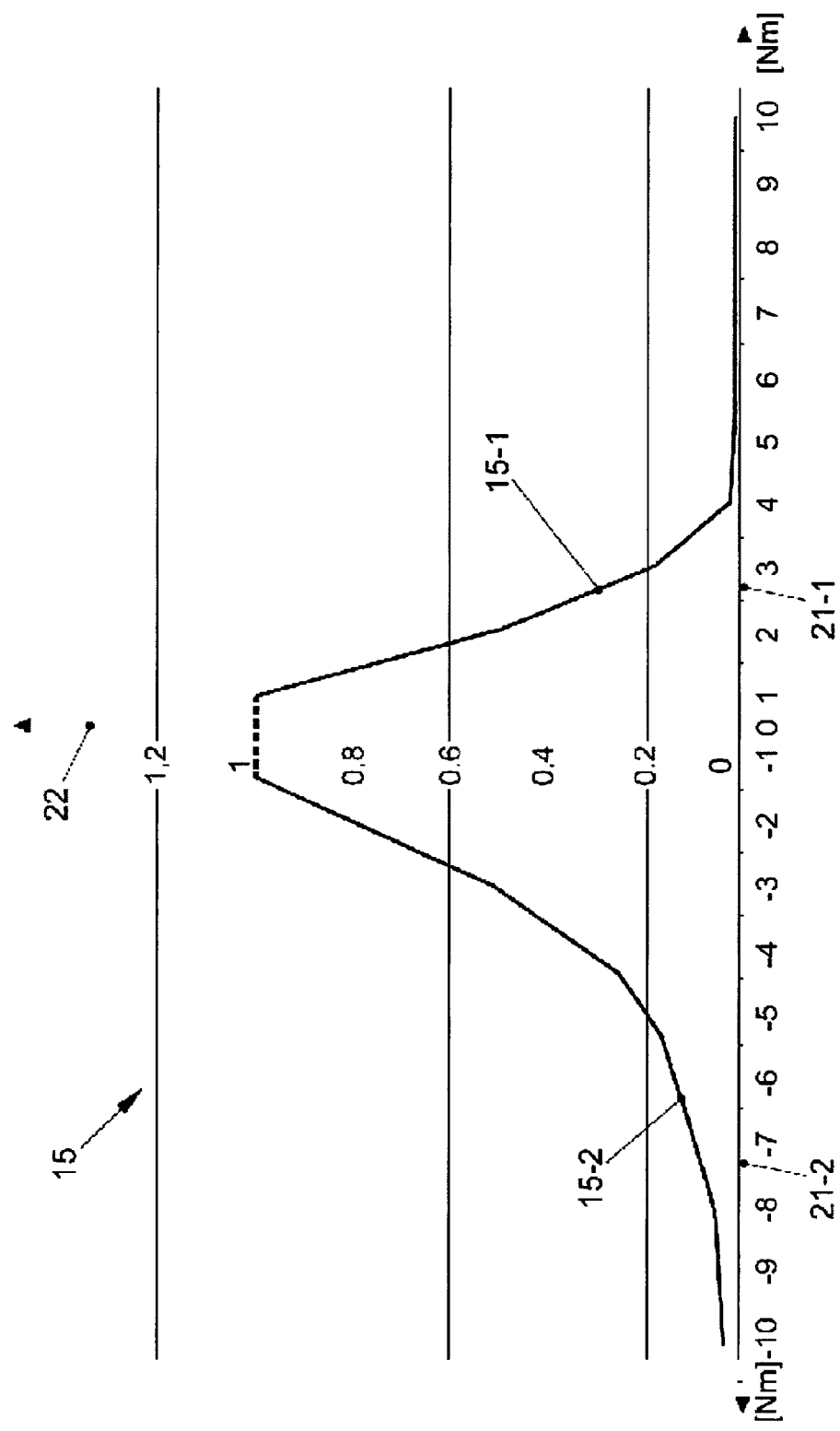
FIG. 4 illustrates a schematic view of a manual torque-dependent characteristic curve of the additional restoring force showing the dependency upon the steering direction.

FIG. 4 illustrates a schematic view of a further manual torque-dependent characteristic curve of the additional restoring force showing a steering direction dependency of the characteristic curve. Like reference numerals describe like terms and features. The manual torque 21-1 is plotted on the x-axis in the direction away from the 0-position and the manual torque 21-2 is plotted in the direction towards the 0-position, again in the unit Nm. It is possible by way of example to provide that a first portion 15-1 of the manual torque-dependent characteristic curve 15 descends more sharply for a manual torque 21-1 in the direction away from the 0-position than another portion 15-2 of the manual torque-dependent characteristic curve 15 that is descending considerably slower for the manual torque 21-2 in the direction towards the 0-position. It is thus possible to achieve that the additional restoring force is reduced more sharply when steering away from the 0-position than when steering towards the 0-position. A characteristic curve 15 of this type is beneficial when it is intended to steer against the additional restoring force, in other words away from the 0-position. In this case, it is necessary in addition to the increased internal friction of the steering system additionally to also steer against the additional restoring force which would make the steering procedure more difficult and would considerably impair a steering sensation of the driver.

The illustrated characteristic curves 15 are merely to be understood as examples and can also comprise a different progression.

Figure 5:
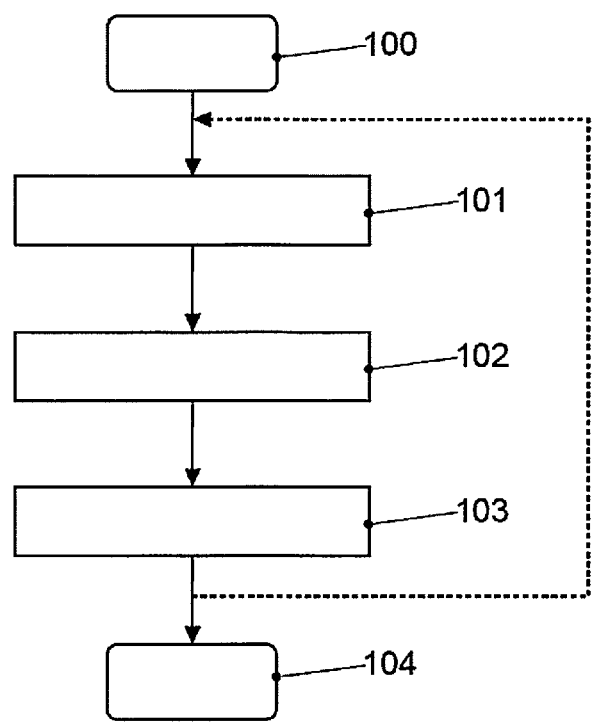
FIG. 5 illustrates a flow diagram of a disclosed embodiment of the method for operating an electric power steering system of a motor vehicle.

FIG. 5 illustrates a schematic flow diagram of a disclosed embodiment of the method for operating an electric power steering system of a motor vehicle. After the start 100 of the method, a temperature-dependent additional restoring force is provided in a first method operation at 101 so as to compensate for an increased internal friction of the power steering system.

In the method operation at 102, a motor vehicle driver's desired steering direction is detected at the steering handle and transmitted to the control unit. Based upon the detected desired steering direction, the additional restoring force is reduced in the method operation at 103. In so doing, it is possible that the additional restoring force is reduced based upon a manual torque-dependent characteristic curve. It is possible to provide that the manual torque-dependent characteristic curve can also take into consideration a steering direction towards or away from a 0-position. By way of example, it is possible to achieve in this manner that the additional restoring force is reduced more sharply when steering away from the 0-position than when steering towards the 0-position.

The described method is by way of example implemented in an electric power steering system for a motor vehicle. In so doing, it is possible to provide that the described method is implemented in a control unit of the power steering system. For this purpose, a computer program having program code is executed in the control unit and the computer program performs the method.

The method is subsequently terminated at operation at 104. It is moreover possible to provide that the method operations 101, 102, 103 are repeated in a cyclic manner.

LIST OF REFERENCE NUMERALS

1 Power steering system
2 Steering handle
3 Steering column
4 Steering mechanism
5 Wheel
6 Toothed rack
7 Pinion
8 Servo drive
9 Electric motor
10 Drive
11 Control unit
12 Sensor system
13 Signal flow diagram
14 Temperature compensating torque
15 Manual torque-dependent characteristic curve
15-1 Portion of the manual torque-dependent characteristic curve
15-2 Portion of the manual torque-dependent characteristic curve
16 Normal assistance torque
17 Entire assistance torque
18 Temperature
19 Manual torque
20 Additional restoring force
21 Manual torque
21-1 Manual torque in the direction away from the 0-position
21-2 Manual torque in the direction towards the 0-position
22 Factor
23 Section
24 Section
25 Temperature sensor
50 Motor vehicle
100-104 Method operation

The invention claimed is:

1. A method for operating an electric power steering system of a motor vehicle, the method comprising:
   receiving specification of a steering wheel angle by a steering handle as a measurement for a desired wheel steering angle for at least one steerable wheel of the motor vehicle;
   providing steering assistance using an electric servo drive having an electric motor;
   determining an additional restoring force based upon temperature to compensate for increased internal friction in the power steering system;
   determining a desired steering direction at the steering handle and determining a directional reduction amount based on the desired steering direction; and
   reducing the additional restoring force by the directional reduction amount.

2. The method of claim 1, wherein the additional restoring force is reduced based upon a manual torque-dependent characteristic curve.

3. The method of claim 1, wherein the additional restoring force is reduced based upon a steering direction such that, from an initial position, the additional restoring force is reduced by the directional reduction amount as a first amount responsive to determination that the desired steering direction is a first direction, and the additional restoring force is reduced by the directional reduction amount as a second amount, different from the first amount, responsive to determination that the desired steering direction is a second direction opposite the first direction.

4. The method of claim 3, wherein the additional restoring force is reduced more sharply when steering away from a 0-position than when steering toward the 0-position.

5. An electric power steering system for a motor vehicle, the electric power steering system comprising:

a steering handle, manipulation of which, specifying a steering wheel angle as a measurement for a desired wheel steering angle for at least one steerable wheel of the motor vehicle;

an electric servo drive having an electric motor for providing steering assistance; and an electronic control unit for the electric servo drive, wherein the electronic control unit compensates for an increased internal friction of the power steering system causing the electrical servo drive to provide an additional restoring force based upon temperature, and wherein the electronic control unit determines a desired steering direction at the steering handle and determines a directional reduction amount based on the desired steering direction, and reduces the additional restoring force by the directional reduction amount.

6. The electric power steering system of claim 5, wherein the electronic control unit is configured to reduce the additional restoring force based upon the manual torque-dependent characteristic curve.

7. The electric power steering system of claim 5, wherein the electronic control unit is configured to reduce the additional restoring force based upon a steering direction such that, from an initial position, the additional restoring force is reduced by the directional reduction amount as a first amount responsive to determination that the desired steering direction is a first direction, and the additional restoring force is reduced by the directional reduction amount as a second amount, different from the first amount, responsive to determination that the desired steering direction is a second direction opposite the first direction.

8. The electric power steering system of claim 7, wherein the electronic control unit is configured to reduce the additional restoring force more sharply when steering away from the 0-position than when steering toward the 0-position.

9. A computer program having program code means to perform a method of operating an electric power steering system of a motor vehicle when the program is executed on a microprocessor of a computer, the method comprising:

receiving specification of a steering wheel angle by a steering handle as a measurement for a desired wheel steering angle for at least one steerable wheel of the motor vehicle;

providing steering assistance using an electric servo drive having an electric motor;

providing an additional restoring force based upon temperature to compensate for increased internal friction in the power steering system;

determining a desired steering direction at the steering handle and determining a directional reduction amount based on the desired steering direction; and reducing the additional restoring force by the directional reduction amount.

10. The computer program of claim 9, wherein the additional restoring force is reduced based upon a manual torque-dependent characteristic curve.

11. The computer program of claim 9, wherein the additional restoring force is reduced based upon a steering direction such that, from an initial position, the additional restoring force is reduced by the directional reduction amount as a first amount responsive to determination that the desired steering direction is a first direction, and the additional restoring force is reduced by the directional reduction amount as a second amount, different from the first amount, responsive to determination that the desired steering direction is a second direction opposite the first direction.

12. The computer program of claim 9, wherein the additional restoring force is reduced more sharply when steering away from a 0-position than when steering toward the 0-position.

13. A control unit of a power steering system, wherein the control unit:

controls an electric servo drive of an electric power steering system for a vehicle to provide steering assistance using an electric motor of the electric servo drive;

compensates for an increased internal friction of the electric power steering system causing the electrical servo drive to provide an additional restoring force based upon temperature;

determines a desired steering direction at a steering handle and a directional reduction amount to the additional restoring force based on the determined desired steering direction; and reduces the additional restoring force by the determined directional reduction amount.

14. The electronic control unit of claim 13, configured to reduce the additional restoring force based upon the manual torque-dependent characteristic curve.

15. The electronic control unit of claim 13, configured to reduce the additional restoring force based upon a steering direction.

16. The electronic control unit of claim 13, configured to reduce the additional restoring force more sharply when steering away from the 0-position than when steering toward the 0-position.

17. The electronic control unit of claim 13, wherein the additional restoring force is reduced based upon a steering direction such that, from an initial position, the additional restoring force is reduced by the directional reduction amount as a first amount responsive to determination that the desired steering direction is a first direction, and the additional restoring force is reduced by the directional reduction amount as a second amount, different from the first amount, responsive to determination that the desired steering direction is a second direction opposite the first direction.

* * * * *